(12) United States Patent
Leone, Jr. et al.

(10) Patent No.: US 6,600,482 B1
(45) Date of Patent: Jul. 29, 2003

(54) METHOD AND SYSTEM FOR FORM RECOGNITION AND DIGITIZED IMAGE PROCESSING

(75) Inventors: Armand Leone, Jr., Glen Rock, NJ (US); Susan B. Read, Congers, NY (US); Scott G. Van Sickle, Hewitt, NJ (US)

(73) Assignee: WorkOnce Wireless Corporation, Toronto (CA)

( * ) Notice: Subject to any disclaimer, the term of this patent is extended or adjusted under 35 U.S.C. 154(b) by 144 days.

(21) Appl. No.: 09/692,272

(22) Filed: Oct. 19, 2000

Related U.S. Application Data

(63) Continuation-in-part of application No. 09/480,914, filed on Jan. 11, 2000.

(51) Int. Cl.⁷ .................................................. G09G 5/00
(52) U.S. Cl. ............................................................ 345/179
(58) Field of Search ................................ 345/156, 172, 345/173, 174, 178, 179; 178/18.01, 18.03, 19.01; 379/88.13; 382/175, 317

(56) References Cited

U.S. PATENT DOCUMENTS

| | | | |
|---|---|---|---|
| 4,752,965 A | 6/1988 | Dunkley et al. ................ 382/3 |
| 5,049,862 A | 9/1991 | Dao et al. .................... 340/706 |
| 5,213,373 A | 5/1993 | Ramos .......................... 283/5 |
| 5,223,677 A | 6/1993 | Kapp et al. .................... 178/18 |
| 5,227,590 A | 7/1993 | Protheroe et al. .............. 178/18 |
| 5,267,155 A | * 11/1993 | Buchanan et al. ...... 364/419.14 |
| 5,317,646 A | 5/1994 | Sang, Jr. et al. ................. 382/9 |
| 5,401,916 A | 3/1995 | Crooks ......................... 178/18 |
| 5,539,159 A | 7/1996 | Protheroe et al. .............. 178/18 |
| 5,555,101 A | 9/1996 | Larson et al. ................ 358/403 |
| 5,587,560 A | 12/1996 | Crooks et al. ................. 178/18 |
| 5,627,349 A | * 5/1997 | Shetye et al. .................. 178/18 |
| 5,629,499 A | 5/1997 | Flickinger et al. ............. 178/18 |
| 5,734,129 A | 3/1998 | Belville et al. ................ 178/18 |
| 5,869,789 A | 2/1999 | Reid-Green .............. 178/18.01 |

OTHER PUBLICATIONS

Railsback, "Cross merges PC with paper," InfoWorld, Mar. 29, 1999, (reprint—1 page).
A. T. Cross Co., "CrossPad User Guide," 1998.

\* cited by examiner

*Primary Examiner*—Matthew C. Bella
*Assistant Examiner*—G. F. Cunningham
(74) *Attorney, Agent, or Firm*—Pearne & Gordon LLP

(57) ABSTRACT

A method and system for automated identification of pre-printed forms, based on the location of a mark made manually on the form. The method comprises the steps of identifying the existence and location of a mark made manually on a form and identifying the pre-printed form based on the location of the mark. The system comprises a digitizer, a pre-printed form, and a template that comprises one or more holes for a user to enter one or more identifying marks to identify the form. The digitizer transmits image data to a computer processor, coupled to a database, including one or more digitized images of marks made on a form. The processor identifies the existence and location of one or more identifying marks made by the user, and identifies the form based on the location of said one or more marks.

16 Claims, 16 Drawing Sheets

NURSE MANAGED DIABETES PROGRAM
EDUCATION: SUBJECT LIST II

LAST NAME | FIRST NAME
VISIT DATE | CDE INITIALS

| | SUGGEST REINFORCEMENT | INITIAL TEACHING | REINFORCEMENT | VERBALIZES UNDERSTANDING | SATISFACTORY DEMONSTRATION |
|---|---|---|---|---|---|
| HYPO/HYPERGLYCEMIA | | | | | |
| DEFINITION & CAUSES | ☐ | ☐ | ☐ | ☐ | ☐ |
| KNOWLEDGE OF SYMPTOMS & TREATMENT | ☐ | ☐ | ☐ | ☐ | ☐ |
| SICK DAY GUIDELINES | ☐ | ☐ | ☐ | ☐ | ☐ |
| CARBOHYDRATES ALWAYS AVAILABLE | ☐ | ☐ | ☐ | ☐ | ☐ |
| MEDIC ALERT/EMERGENCY SYSTEMS | ☐ | ☐ | ☐ | ☐ | ☐ |
| GLUCOGON | ☐ | ☐ | ☐ | ☐ | ☐ |
| HYPOGLYCEMIA TREATMENT | ☐ | ☐ | ☐ | ☐ | ☐ |
| GUIDELINES GIVEN | ☐ | ☐ | ☐ | ☐ | ☐ |
| NUTRITION | | | | | |
| MEAT PLANNING/PRESCRIBED DIET (SPECIFY) | ☐ | ☐ | ☐ | ☐ | ☐ |
| IMPORTANCE OF MAINTAINING BODY WEIGHT | ☐ | ☐ | ☐ | ☐ | ☐ |
| SNACK BASED ON MEAL PLAN | ☐ | ☐ | ☐ | ☐ | ☐ |
| MEAL TIMING ITS IMPORTANCE | ☐ | ☐ | ☐ | ☐ | ☐ |
| EATING OUT, ALCOHOL OTHER DIET CHANGES | ☐ | ☐ | ☐ | ☐ | ☐ |
| EXERCISE | | | | | |
| EXERCISE & GLUCOSE CONTROL | ☐ | ☐ | ☐ | ☐ | ☐ |
| REASONS FOR REGULAR, AEROBIC EXERCISE | ☐ | ☐ | ☐ | ☐ | ☐ |
| EXERCISE TIMING RELATED TO FOOD & MEDICATION | ☐ | ☐ | ☐ | ☐ | ☐ |
| EXERCISE PRECAUTIONS | ☐ | ☐ | ☐ | ☐ | ☐ |
| EXERCISE PROGRESSION | ☐ | ☐ | ☐ | ☐ | ☐ |

PAGE NO. ☐

```
NAME OF PROGRAM                                    [-][□][×]
FILE   EDIT   VIEW
[←→][↕][✥][○][○][○][○]                              ▲

⊕ ENVIRONMENTAL EXPOSURES        ┌─────────┐
                                 │ ┌─────┐ │
HAVE YOU EVER WORKED AS ONE OF THE│ └─────┘ │
FOLLOWING? (CHOOSE ALL THAT APPLY)└─────────┘
                          <THAN  1 TO 5  6 TO 10  >THAN
                          1 YEAR  YEARS   YEARS  10 YEARS
FLIGHT CREW/AIRLINE PILOT   □      □       □       □

X-RAY TECHNICIAN            □      □       □       □

NUCLEAR PILOT WORKER        □      □       □       □

CHEMICAL/PETROLEUM PLANT WORKER □  □       □       □.

TRANSPORTER OF CHEMICAL     □      □       □       □
PETROLEUM PRODUCTS

EXTERMINATOR                □      □       □       □

WORKED ON A FARM WHERE      □      □       □       □
PESTICIDES WERE USED

GARDENED WITH USE OF PESTICIDE □   □       □       □    ▼

PROMPT               │  DURATION   │  VERIFY
FLIGHT CREW/AIRLINE FLIGHT PILOT │ 4 TO 10 YEARS │
[START][DISTILLER][TASKS][INBOX][MICROSOFT]
```

FIG. 8

SOCIAL HX II
NURSE MANAGED DIABETES PROGRAM

LAST NAME   FIRST NAME
VISIT DATE   CDE INITIALS

START HERE

EDUCATION LEVEL
NO FORMAL SCHOOLING ☐
ELEMENTARY (1-6) ☐
SOME HIGH SCHOOL (7-11) ☐
HIGH SCHOOL GRAD/GED ☐
SOME COLLEGE/TECH SCHOOL ☐
COLLEGE GRADUATE ☐

TYPE OF WORK
PROFESSIONAL/SKILLED ☐
UNSKILLED/LABOUR ☐

LANGUAGE NEEDS
ENGLISH ☐
SPANISH ☐
OTHER ☐

TOTAL NUMBER IN HOUSEHOLD:

EMPLOYMENT
EMPLOYED FOR WAGES ☐
SELF-EMPLOYED ☐
UNEMPLOYED ☐
HOMEMAKER ☐
STUDENT ☐
RETIRED ☐
DISABLED ☐

RACE/ETHNICITY
ASIAN ☐
AFRICAN-AMERICAN ☐
CAUCASIAN ☐
CUBAN-AMERICAN ☐
MEXICAN-AMERICAN ☐
NATIVE-AMERICAN ☐
PUERTO-RICAN ☐
OTHER ☐

0050013 0-02

PAGE NO.

METHOD AND SYSTEM FOR FORM RECOGNITION AND DIGITIZED IMAGE PROCESSING

CROSS-REFERENCE TO RELATED APPLICATION

This application is a continuation-in-part of application Ser. No. 09/480,914, filed Jan. 11, 2000, the contents of which are incorporated herein by reference.

FIELD OF THE INVENTION

The present invention relates generally to data entry using a digitizer device and, more particularly, to a system and method for identifying forms placed on a digitizer and for determining and correcting digital image offset for digitizer pads.

BACKGROUND

Systems are known that automatically identify forms placed on a digitizer device. (The term "form," as used herein, refers to a printed image on a page, rather than to an actual page; that is, if two pages are printed with the same image, they are considered the same form.) For example, U.S. Pat. No. 5,869,789 (Reid-Green) discusses a page recognition system that detects a page number pre-coded onto a sheet of paper when the sheet of paper is mounted on the digitizer system. The system utilizes a built-in scanner to detect a pre-coded page identifier on the back-side of the page. U.S. Pat. No. 5,555,101 (Larson et al.) discusses an automated page recognition system for forms received by facsimile and also uses a pre-printed pattern to identify a form.

U.S. Pat. No. 5,629,499 (Flickinger et al.) discloses an electronic clipboard and discusses two methods for recognizing forms used thereon. In the first method, a toggle switch is used to toggle between various form identifiers displayed on the clipboard; in the second method, a bar-code reader reads a bar-code pre-printed on the form. The toggle-display requires the clipboard to contain a micro-processor that may need to be re-programmed every time a new set of forms is used.

Digitizing notepads are known that record notations made on paper forms mounted thereon. For example, A.T. Cross Company has marketed a CrossPad 35 (see FIG. 1), a portable digital notepad that digitizes and records pen movements using radio transmission. The CrossPad transmits the recorded pen movements to a personal computer for processing and analysis. The CrossPad, however, is not itself capable of identifying pre-printed forms.

The information recorded by the CrossPad and transmitted to a computer only comprises the pen strokes entered by a user writing on a form. Information pre-printed on the form cannot be detected by the Crosspad. The CrossPad does not have a form ID display that can be toggled through by a user, nor does it have a bar-code reader.

Because devices such as the CrossPad only detect information that is written by a user, such devices generally cannot be used in systems that identify a form based on pre-printed information. Even systems such as those disclosed in Reid-Green are not capable of detecting form identification information when multiple forms are placed on the digitizer. For example, Reid-Green would only identify the form that is at the bottom of the stack. The device discussed in Flickinger et al. might be capable of reading multiple pages, but such a device requires additional (and costly) form-reading mechanisms not present in CrossPad-type devices. The use of a bar-code reader or other form-reading mechanism in a digitizer increases the cost and the weight of the digitizer.

Another drawback of CrossPad-type devices is that the spatial relationship of written marks on the paper form is not identical to the spatial relationship of the corresponding digital markings on the underlying "digital form." This offset ("digital drift") can be as much as several millimeters.

A further drawback of CrossPad-type devices arises from the fact that when a form is used, the pre-printed information on the form is not part of the digital ink file that is uploaded. In order for the digital ink file to be optimally useful after upload, an image of the contextual information present on the paper form at the time of use needs to be added to the digital ink image. The two images must be correctly aligned, so that an image of the original form, with the information written thereon, can be re-created.

There is therefore a need for a system of automated form identification that is capable of recognizing forms used on the CrossPad, and similar devices, without relying on pre-printed information on the forms.

There is a further need for a system that does not require a cumbersome LCD display (along with a programmable microprocessor) and toggle switch or other input device to be integrated into a CrossPad-type of electronic clipboard.

There is a further need for a method and system for correcting digital drift for CrossPad-type devices and other digitizers. There is a further need for a method of combining and aligning a digital ink image of handwritten information on a form with an image of the underlying form.

SUMMARY

The present invention comprises a method for automated identification of pre-printed forms, comprising the steps of identifying the existence and location of a mark made manually on a pre-printed form and identifying the pre-printed form by comparing the location of the mark to a database listing forms and corresponding locations of identifying marks. The invention further comprises a system for identification of pre-printed forms, comprising a digitizer; a pre-printed form comprising one or more pre-printed indicators unique to the form indicating where a user is to enter one or more identifying marks; and a computer processor, coupled with a database, that receives one or more digitized images of marks made on the form, identifies the existence and location of one or more identifying marks made by the user, and identifies the form by comparing the location of said one or more marks to a database listing forms and corresponding locations of identifying marks.

The present invention also comprises computer software for automated identification of pre-printed forms, comprising software for receiving and storing data describing the location of a mark made manually on a pre-printed form and software for identifying said form by comparing the location of said mark to a database listing forms and corresponding locations of identifying marks.

The present invention further comprises a method for correcting digital drift and for mapping a digital ink file onto a digital form. Typically, a digitizing pad (e.g., a CrossPad or similar device) suffers from a certain amount of digital drift—the spatial difference between the relative location of a writing on a paper form and the relative position of the corresponding digital mark on the underlying digital form. The amount and direction of digital drift is constant for each pad (and anywhere on a given form), but typically varies from pad to pad.

Software of a preferred embodiment determines the amount and direction of digital drift by reference to a known landmark on a given form. Preferably, such a landmark is a form-identification mark, discussed below. In a preferred embodiment, the form identifier is a circle. The digital drift is determined by comparing the known position of the center of the form identifier circle on the paper form with the center of the corresponding digital mark on the digital form underneath, then determining variances in horizontal and vertical directions. Once the digital drift is determined, it is applied as a correction factor to all of the digital markings on the form.

This correction factor is preferably used to facilitate the alignment of a handwritten digital ink image with an image of the underlying form. This alignment is accomplished by first identifying the form that digital ink data was written on. A pre-loaded image of the identified form is then retrieved from a database. The correction factor is used to align the ink data with the digital form. The correct alignment of the digital form with the digital ink enables replication of the paper form as it appeared when it was filled out. The correct alignment further enables the composite image to be processed by optical mark recognition (OMR), optical character recognition (OCR), and image snippets storage into a database.

The present invention further comprises a method and system for creating enabling identification of forms that have not had a form-identification mark pre-printed thereon. In a preferred embodiment of this aspect of the invention, a metal or plastic guide with three-millimeter holes positioned at various selected locations in the guide is affixed to one side of a digitizer pad. Preferably, the guide is affixed at a pre-determined location linked to a customer. The fixing of the guide to the side of the pad in a pre-determined location enables a user to make a mark in a hole, wherein the location of the hole corresponds to the location that a pre-printed mark would have. That is, the mark has the same location that a mark that filled in a pre-printed form identification circle would have. This allows clients who have preprinted forms that were not printed with form identification marks to use those forms in the remainder of the disclosed system.

BRIEF DESCRIPTION OF THE DRAWINGS

FIGS. 2 and 3 depict data collection forms used in a preferred embodiment of the present invention.

FIG. 8 depicts a graphical user interface used in a preferred embodiment of the present invention.

FIG. 16 depicts a digitizer pad with three side paper guides.

DETAILED DESCRIPTION OF PREFERRED EMBODIMENTS

Figure 1:
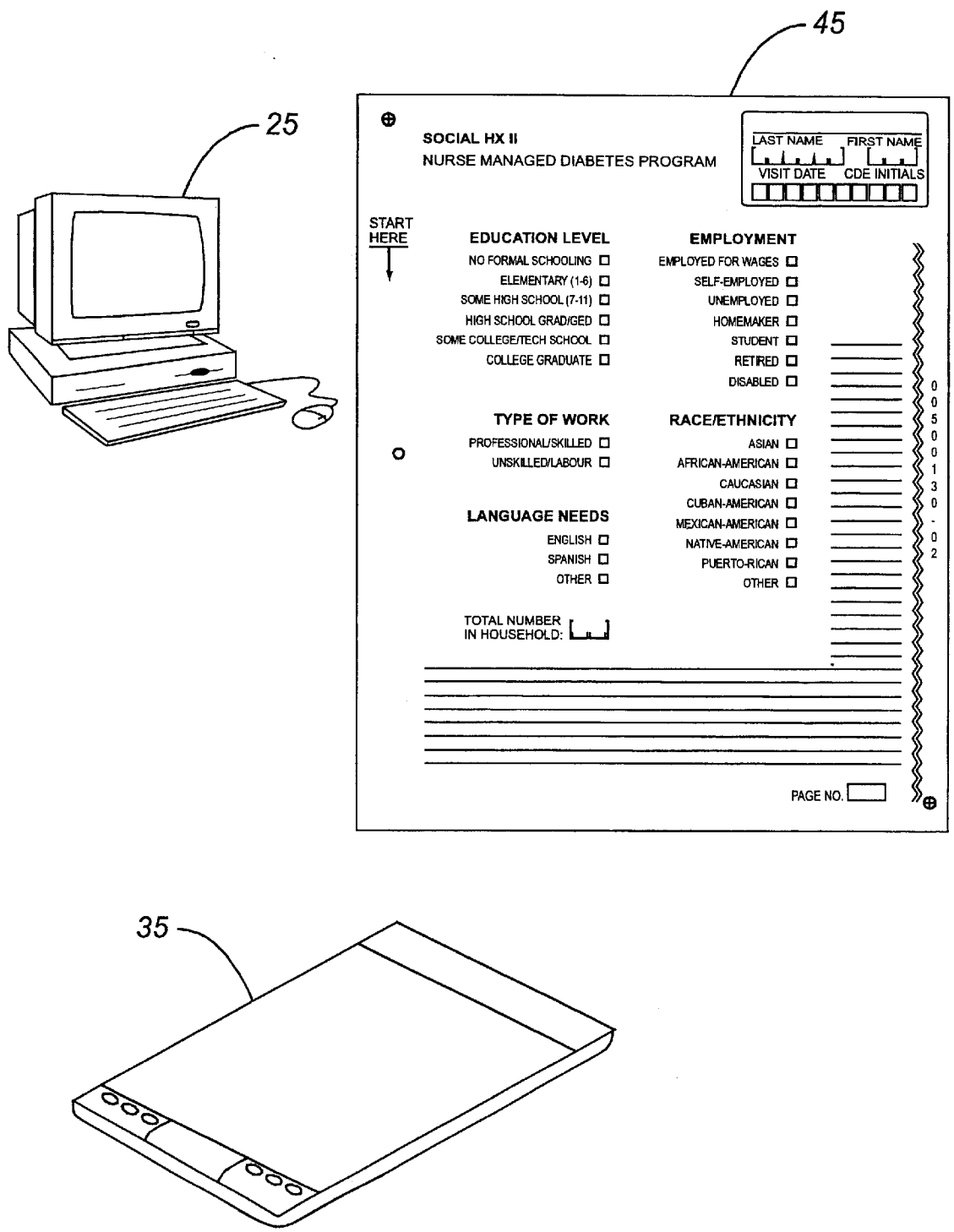
FIG. 1 displays components of a preferred embodiment of a preferred digitizer system.

In a preferred embodiment, the system and method are used in conjunction with a digitizer system, shown in FIG. 1, comprising a digitizer 35, such as a CrossPad, pre-printed forms 45, a personal computer 25, and accompanying software. For ease of reference, the term "CrossPad" is used herein to refer to any digitizer pad to which the described invention is applicable. Those skilled in the art will recognize that the system and method are applicable to any digitizer system in which a form can be placed in a digitizer field. Further, although the term "form" is used in this description to refer to forms printed on paper, those skilled in the art will recognize that the disclosed system and method is equally applicable to forms embodied in other media. For example, the disclosed invention also works for forms on plastic laminates or "electronic paper" such as the "Gyricon" product developed by Xerox Corporation of Palo Alto, Calif. or a similar product developed by E Ink Corporation of Cambridge, Mass.

The general operation of the digitizer system shown in FIG. 1 is as follows. A pre-printed data collection form 45 is placed on a CrossPad digitizer 35. A user places marks on the form 45 using the special pen that is required by the CrossPad 35. The marks made on the form 45 are recorded as digitized images by the CrossPad 35. The user connects the CrossPad 35 to a computer 25 and the CrossPad 35 transmits the images it has stored to the computer 25. In an alternate embodiment, the CrossPad is connected to a converter that converts the Crosspad data into an Internet-compatible format, and the converted CrossPad data is transmitted by the converter to a remotely located computer via the Internet. In either embodiment, the stored Crosspad images on the computer 25 are then processed by software stored on a computer. The forms and software used in a preferred embodiment are described below.

FIG. 2 depicts a first data collection form 45 used in a preferred embodiment. An area 210 at the left margin of the form is reserved for form identification. A "Start Here" instruction 225 reminds a user that an indicator 230 for a form identifier is to be filled in (the circle is the indicator; the mark made by filling in the circle is the form identifier). For each different form, the form identifier indicator 230 is located in a different zone in area 210.

The forms used in a preferred embodiment are printed so that they may be used in one or more data-entry systems. For example, the cross-hair images 215 at the lower right of the form and 220 at the upper left of the form are used to align the image of the form if it is scanned in by an optical scanner.

Figure 3:
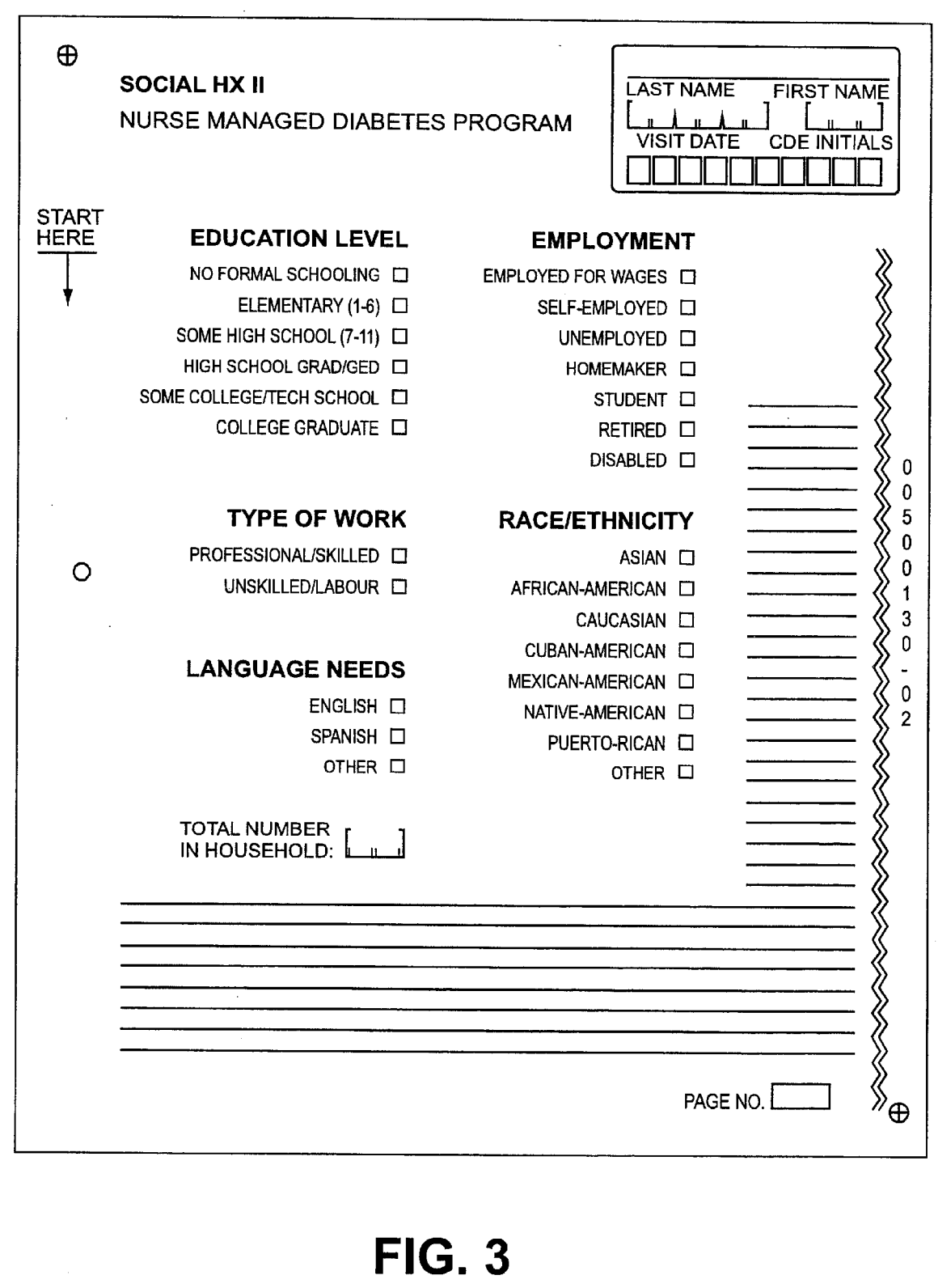

FIG. 3 depicts a second data collection form used in a preferred embodiment. The form in FIG. 3 is shown without reference numbers in order to more clearly show the appearance of forms used in a preferred embodiment. Note that the form identifier indicator on the form in FIG. 3 is located in a different zone of area 210 than the form identifier indicator 230 on the form shown in FIG. 2.

Preferably a user fills in a form identifier indicator each time the user begins to write on a form. However, to reduce errors, a first user may prefer to fill in a plurality of indicators before handing a CrossPad over to a second user. For example, a first user may use a template comprising indicators for all forms. If forms 1, 3, and 6 are to be used, the first user places the template on the CrossPad and fills in the indicator for form 1, hits the Next Page button on the CrossPad, fills in the indicator for form 3, hits the Next Page indicator again, and fills in the indicator for form 6. The first user then hits the Back Page button twice, and passes the CrossPad, with forms 1, 3, and 6 clipped thereon, to a second user. The second user can then fill in forms 1, 3, and 6 without needing to fill in the appropriate form identifier indicators (although the Next and Back page buttons will still need to be pressed when the second user goes from form to form).

Figure 4:
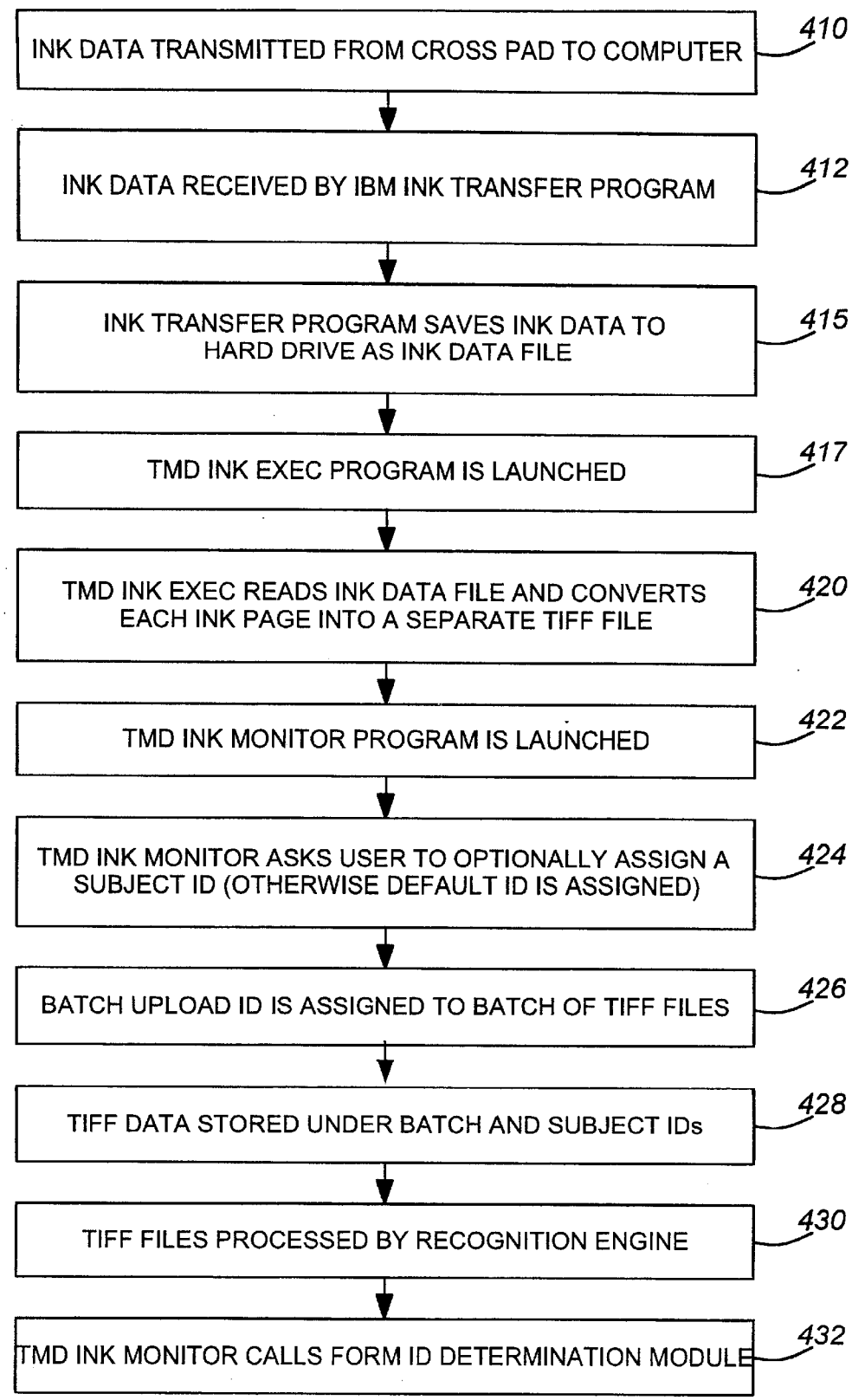
FIG. 4 is a flow diagram showing the operation of software for processing digitized data.

FIG. 4 is a flow diagram showing the operation of software used in a preferred embodiment. When the form identifier indicator 230 is filled in by a user of the Crosspad 35, the image and location of the form identifier, along with image and location data for any other information written on the form by a user, is stored in the CrossPad memory. The CrossPad stores this information as "ink data," which is an IBM proprietary data format, though any suitable format for storing this data may be used. This data is referred to generally herein as ink data.

At step 410 the user uploads the collected ink data to a personal computer by plugging the CrossPad into a serial connection cable (although infrared, ethernet, or other connection devices could also be used) attached to the personal computer and then pressing a button on the Crosspad. In an alternate embodiment, the ink data is transferred first to a converter, which then sends the data to a remotely located computer, preferably over the Internet. The remotely located computer can be a personal computer, but is preferably a server-class computer (e.g., an Internet server), since it is expected that the computer will be receiving data from a plurality of sources.

At step 412 an ink transfer program stored on the personal computer receives the transferred ink data and at step 415 saves the data to the computer's hard drive as an ink data file. In a preferred embodiment, an IBM Ink Manager Transfer program, supplied with the Crosspad, performs this step and creates a file known as a "notebook."

After the ink data file is uploaded, the ink transfer program launches an ink converter program (referred to herein as TMDInkExec) at step 417. At step 420 TMDInkExec reads the uploaded ink data file and converts each ink page into a non-proprietary image file (such as group 4 TIFF, but other formats could also be used) by calling ink conversion modules included in an IBM-provided library, IBM Electric Ink SDK. TMDInkExec calls the appropriate ink conversion modules according to instructions contained in documentation included with IBM Electric Ink SDK. In an alternate embodiment, the conversion at step 420 from notebook format into non-proprietary image format can also occur at a remotely located computer: the ink data is transferred to the remote computer using, e.g., email or file transfer protocol, then the remote computer (or computers) poll multiple receiving queues (e.g., email-boxes) and perform step 420, processing the received batches of ink data.

Upon completion of step 420, the TMDInkExec program at step 422 notifies a second program, TMDInkMonitor, to further process the TIFF data. The TMDInkMonitor program, at step 424, displays a graphic interface for the user to optionally assign or confirm a subject ID to the batch of pages in the ink data file (for example, if the pages are forms that have been filled in for a particular medical patient, the patient's ID would be entered). If a scanner is used instead of a CrossPad, a subject ID label may be affixed to the form, recognized, and the recognized number assigned by the system. If a subject ID is not assigned by the user (and has not been recorded by the CrossPad), the TMDInkMonitor program assigns a default subject ID (preferably the previous subject ID incremented by 1).

A batch upload ID is assigned at step 426 to the corresponding batch of TIFF image files, and at step 428 the TIFF data is written into a database under both the batch upload ID and the subject ID. The TIFF image files are then copied out of the database and processed at step 430 by a recognition engine that turns the images into recognized data by applying OMR (optical mark read, or optical mark recognition) technology. A recognition engine is software that provides a documented set of services to another software module or program related to the transformation (recognition) of image data into computer readable text. A Caere Developer's Kit 2000 Recognition Engine, sold by Caere Corporation of Los Gatos, Calif. is used in a preferred embodiment, but numerous recognition engines are commercially available (e.g., from Mitek Systems; Inc., of San Diego, Calif. and National Computer Systems, Inc., of Minneapolis, Minn. and could also be used in a preferred embodiment by those skilled in the art.

Figure 5:
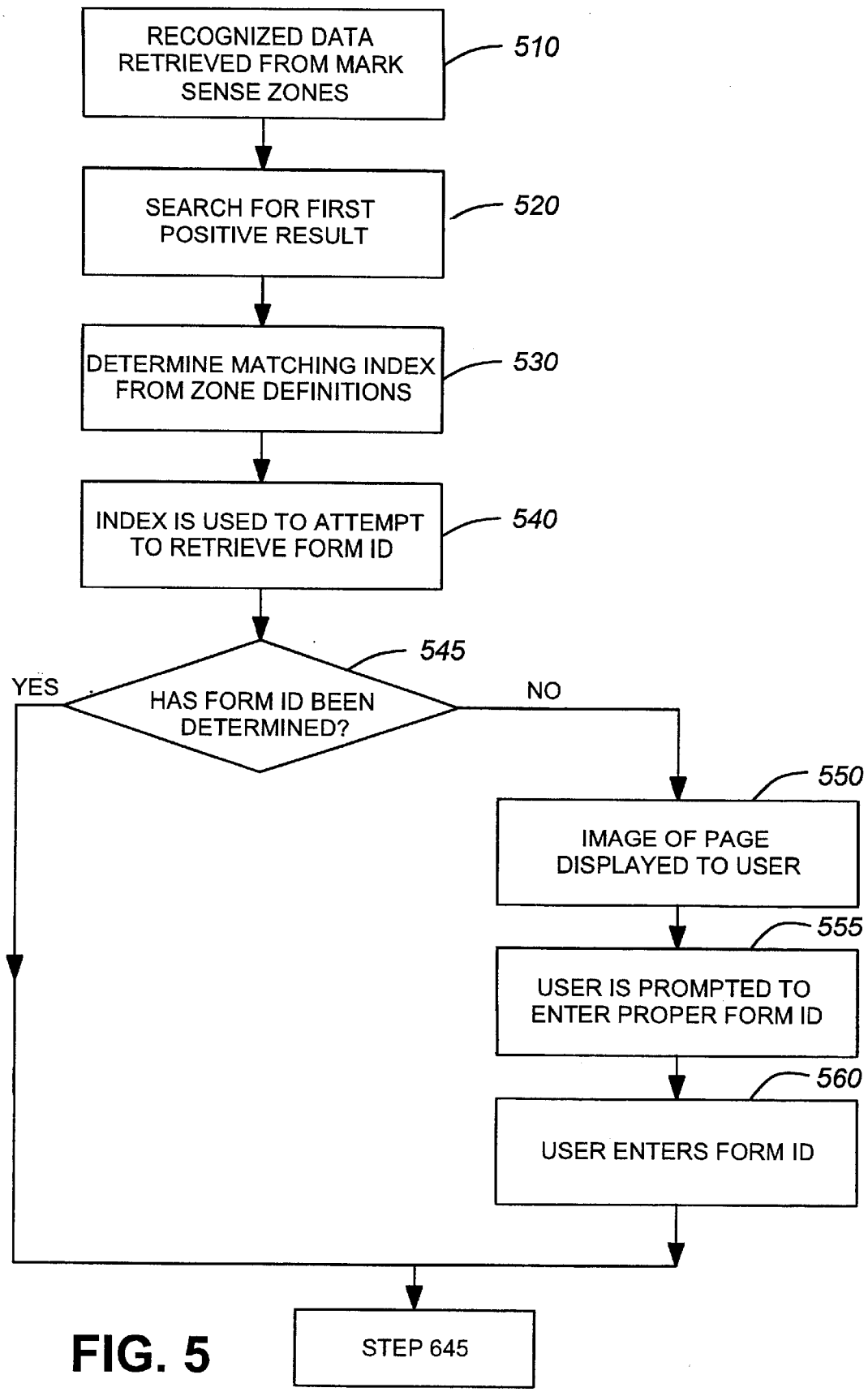
FIGS. 5 and 6 depict a flow diagram showing the operation of form recognition software.
Figure 6:
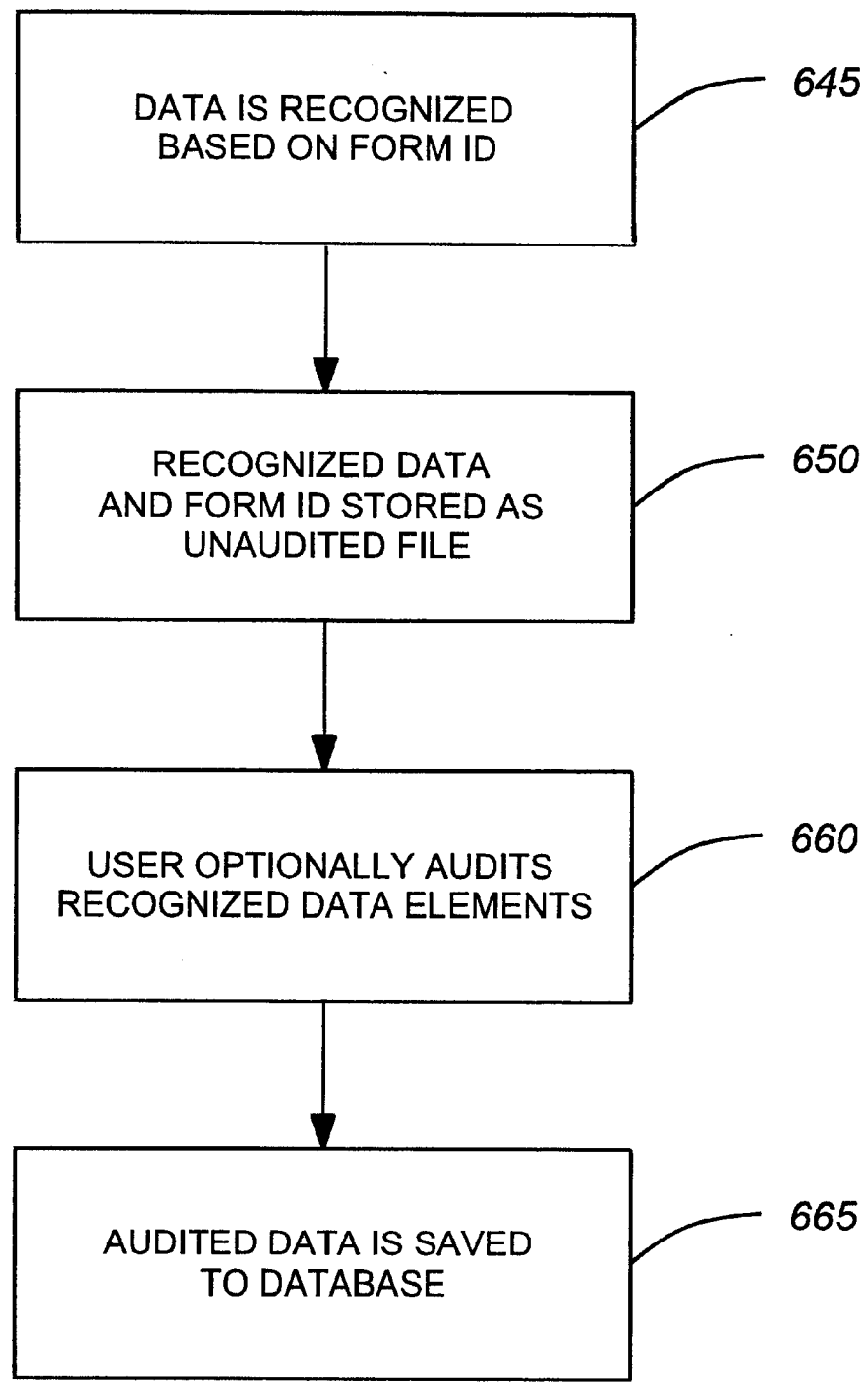

At step 432 TMDInkMonitor calls a Form ID determination module that in turn derives the form ID corresponding to the recognized data. The steps performed by the Form ID determination module are illustrated in FIGS. 5 and 6.

The form ID determination module uses an OMR Recognition Module and an OMR filling method. A recognition module is software that conforms to the specifications of a recognition engine and that transforms different types of image data into computer readable text. A filling method specifies the type of image data that is expected to appear inside a zone. Some filling methods are associated with a unique recognition module; others are supported by more than one. Some examples of filling methods are: multiple font machine print, OMR, hand-print, bar-code, dot-matrix printing, OCRA, and Braille.

A zone is an area in an image, up to fill page size, containing a feature of interest to the user. In a preferred embodiment, the zones are rectangular, but those skilled in the art will recognize that differently-shaped zones can also be used. The image data covered by the zones are handled and processed separately. General zone types are graphical (no recognition), textual, and others such as bar code or OMR. To facilitate recognition of the image data in the zone areas, each zone is assigned properties based on the expected information that it will contain. The basic zone properties are x-y coordinates, size, recognition module, filter, language dictionary, and user dictionary. A language dictionary is a file that contains a language's lexical elements plus rules for generating words from them. The file can be used to mark non-dictionary words in recognized text, or to change non-dictionary words to acceptable words. Some recognition modules consult the language dictionary to help them make recognition decisions. A user dictionary contains lists of words, strings, and regular expressions defining character patterns, supplementing the content of the language dictionary file. One or more user dictionaries can be associated with a particular zone. A regular expression in a user dictionary defines a permissible pattern of characters by specifying character classes, ranges or individual characters that are valid for one or more character positions in a zone to improve recognition accuracy. A regular expression is also called a mask or a pattern. Regular expressions are usually used in form-like situations, where zone content is in some way predictable.

A Form Identification Zone Template, or FIZT) is used in identifying a form from an image. A zone template is a set of zone and page properties (corresponding, for example, to a form to be recognized) that is specified and stored, for later retrieval and processing, in a medium such as a disk file or database record. The FIZT consists of a set of zones which are laid out in a grid pattern (see FIG. 7). Filters can be applied at either the zone level or the form level to improve recognition results. Filters are specifications for the elimination of certain categories of characters from being considered as possible valid results. Examples of filters include: digits only, uppercase letters, lowercase letters, and punctuation.

Because the subject invention utilizes OMR technology, in a further preferred embodiment, non-standard symbols (such as an encircled N—analogous to the symbol ©) are used to indicate pertinent information on a form. Examples of such pertinent information comprise the following: cut-and-paste areas; information that needs to be corrected; and a reference to another data file.

Figure 7:
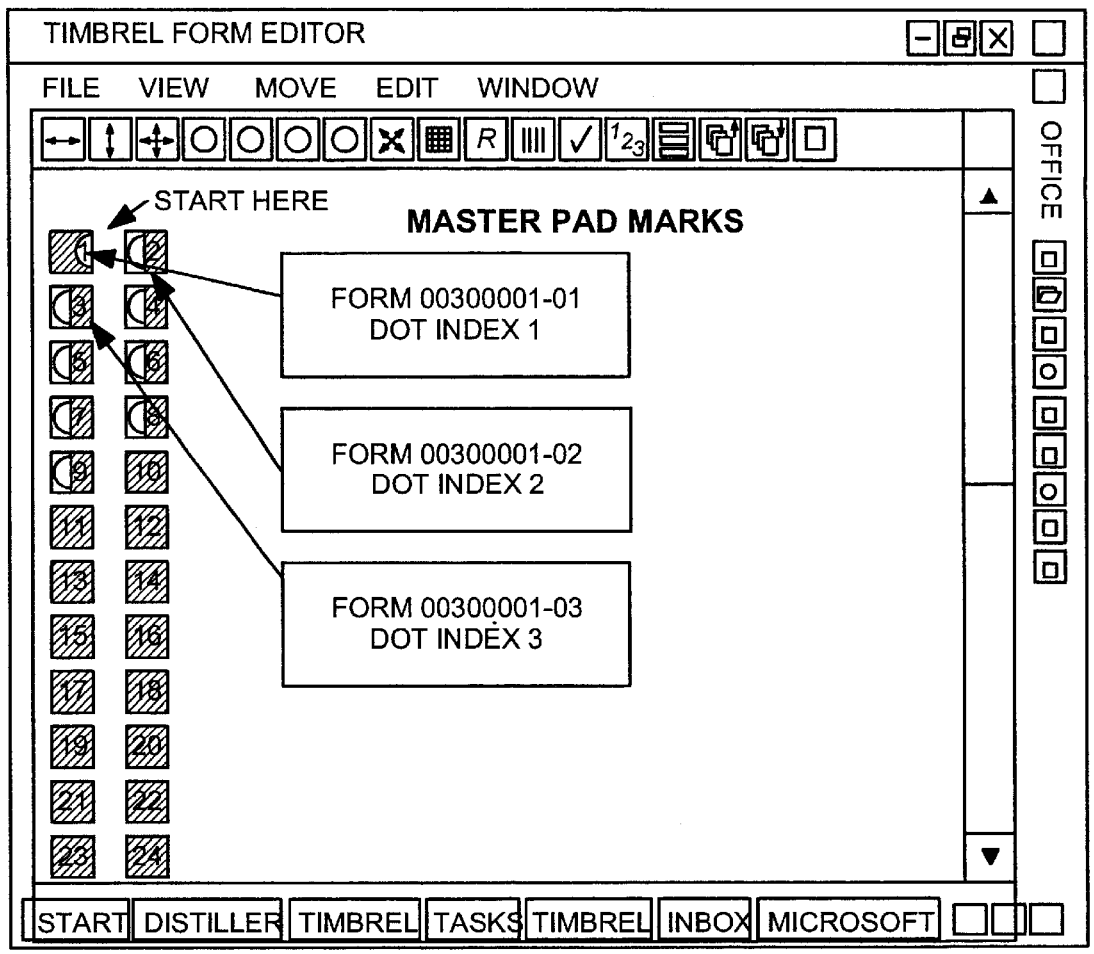
FIG. 7 illustrates placement of zones used in a preferred embodiment of the present invention.

The zones for form recognition are ordered left to right and top to bottom as shown by the shaded numbers in FIG. 7. Each zone corresponds to a form number in the set to which the form belongs. The zones are laid out with enough space between them to minimize the possibility of a false form identification caused by the writer marking outside of the circle or caused by skewing when a form is scanned in. Each form in a set is assigned a zone that corresponds to its form number, and an unfilled dot is pre-printed within the assigned zone on the form page (see FIGS. 2 and 3). Each zone, and thus each dot, is assigned a number. A table ("dot map") maps the dot number to a form number in the form set. An example table for dot mapping is as follows:

| Dot Number | Form ID Number |
|---|---|
| 1 | 00300001-01 |
| 2 | 00300001-02 |
| 3 | 00300001-03 |

The "dot map" is stored for later retrieval in a storage medium such as a database table or a disk file.

Referring to FIG. 5, at step 510 the form ID determination module retrieves recognized data from mark sense zones. At step 520 a search is performed for the first filled-in dot and corresponding zone, and at step 530 its dot number is determined from the zone definitions. At step 540, the corresponding form ID number is retrieved from a dot mapping table based on the dot number (for example, in the above table, dot number '1' corresponds to form ID number '00300001-01'). If at step 545 the form ID number has not been determined, at step 550 an ink-data-based image of the page is displayed to a user and at step 555 the user is prompted to enter the proper form ID number. At step 560, the user enters the form ID number. Although a preferred embodiment uses numbers to identify forms, those skilled in the art will recognize that alphanumeric or other symbols could also be used. The process shown in FIG. 5 is shown in somewhat more detail in FIG. 14.

Figure 12:
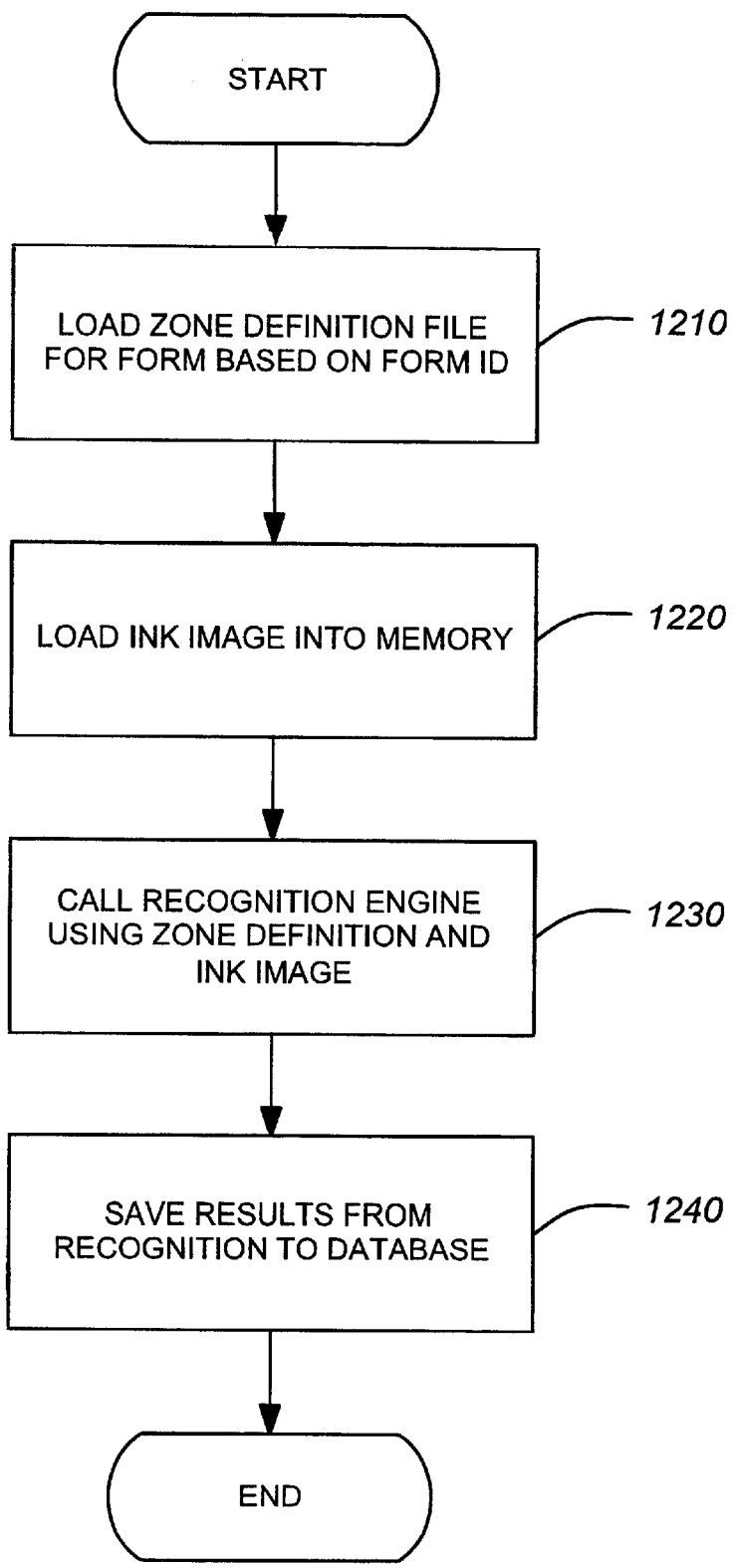
FIG. 12 depicts a recognize-aligned-image process of a preferred embodiment.

Referring to FIG. 6, after the form ID number has either been determined by the system or entered by a user, step 645 is performed. At step 645 the data is further recognized (applying, for example, optical character recognition, or handprint recognition-also known as ICR, for Intelligent Character Recognition; a preferred method of recognition is depicted in FIG. 12), based on the form ID number, and at step 650 the recognized data and the ID number of the form on which the images were written are stored as an unaudited file in the database. The recognized data is organized according to the categories of the form and optionally displayed on a user's audit screen. The data is displayed in a format, such as a table, that is convenient for auditing. At step 660 the user optionally audits, verifies, and corrects, if appropriate, each recognized data element on the audit screen. In a preferred embodiment, a graphical user interface (GUI) 810 (see FIG. 8) enables a user to view the data in a "contextual orientation": if, for example, some data is not recognized, a user can have an image of a portion of the paper form displayed on the screen, with an image of the ink data for that page overlaid onto the image of the paper form so as to present to the user an on-screen image of a portion of the written-on paper form. This enables the user to audit and verify the data elements without having the written-on form present, and to view all of the images written on the paper form. This in turn enables an operator to perform auditing and verification at a site remotely located from the site where the paper forms have been written on. Further, when the data are, for example, medical reports, contextually-oriented on-screen viewing of the handwriting on the form enables a user to reconstruct the mood of the writer when the report was taken, as well as the personality of the patient.

At step 665 the audited data is saved to the database.

Figure 9:
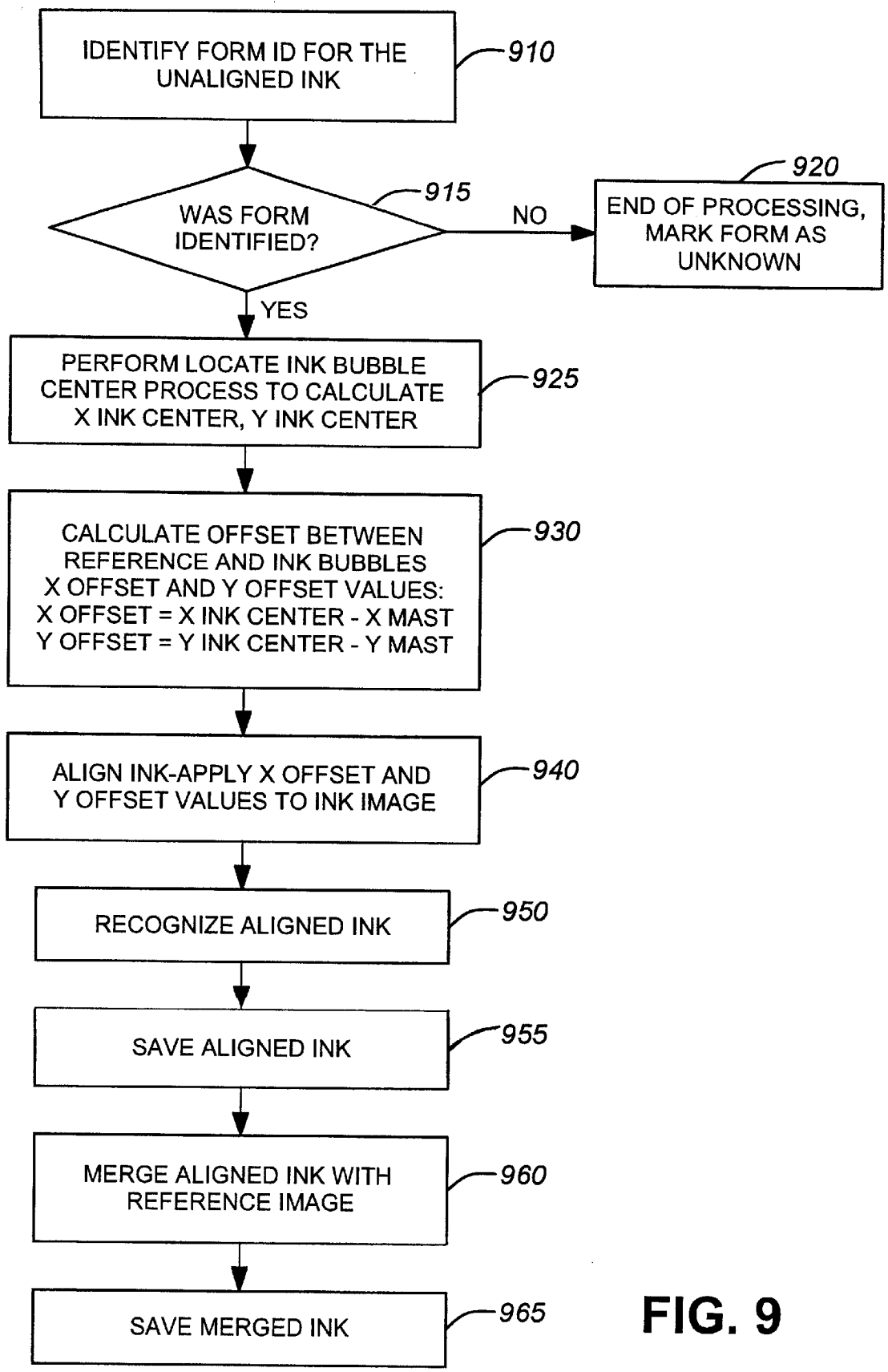
FIG. 9 depicts steps of a main form alignment process used in a preferred embodiment.

FIG. 9 depicts an overview of a preferred form alignment process. At step 910, the form identification process described in FIGS. 5 and 6, with associated text, is performed. At step 915, if the form identification step 910 was not successful, at step 920 the form alignment process terminates, with the form marked as "unknown."

If the form identification step 910 was successful, then at step 925, a Locate Ink Bubble Center Process (see FIGS. 10 & 11 and associated text) is performed on an ink image bubble. This step results in the calculation of the coordinates (XInkCenter, YInkCenter) of the ink image bubble.

Following step 925, the offset (XOffset, YOffset) between a reference bubble and the ink image bubble is calculated: XOffset=XInkCenter−Mast; YOffset=YInkCenter−YMast. XMast and YMast are denoted in FIG. 10 by X0 and Y0, respectively.

At step 940, ink alignment is performed: the XOffset and YOffset values are applied to the ink image, and the image is shifted accordingly.

At step 950, the aligned ink image is recognized (see FIG. 12 and associated text). Finally, at step 960, the recognized, aligned ink image is merged with the reference image (the stored image of the identified form.)

Figure 10:
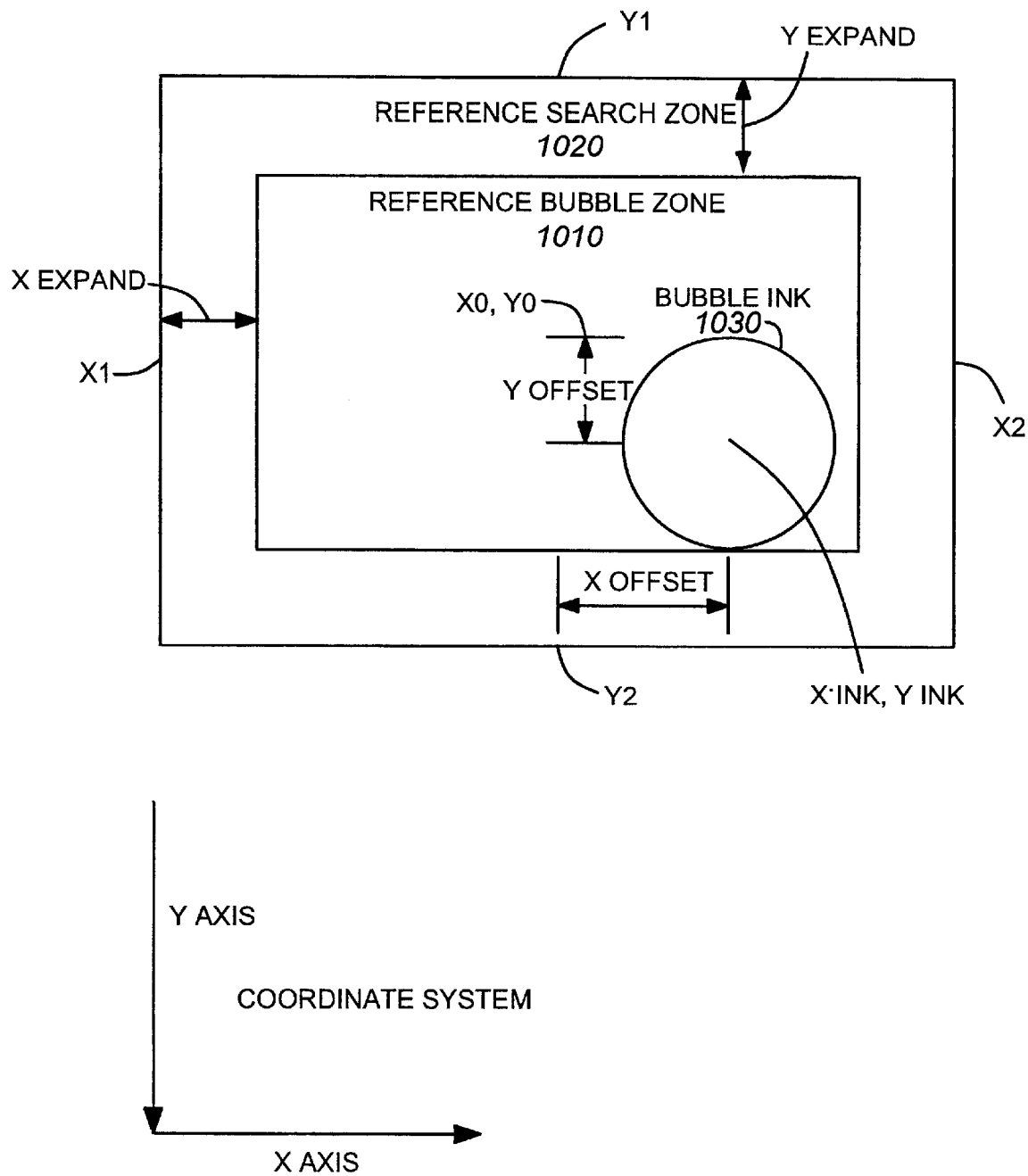
FIG. 10 illustrates coordinate definitions used in a preferred embodiment.
Figure 11:
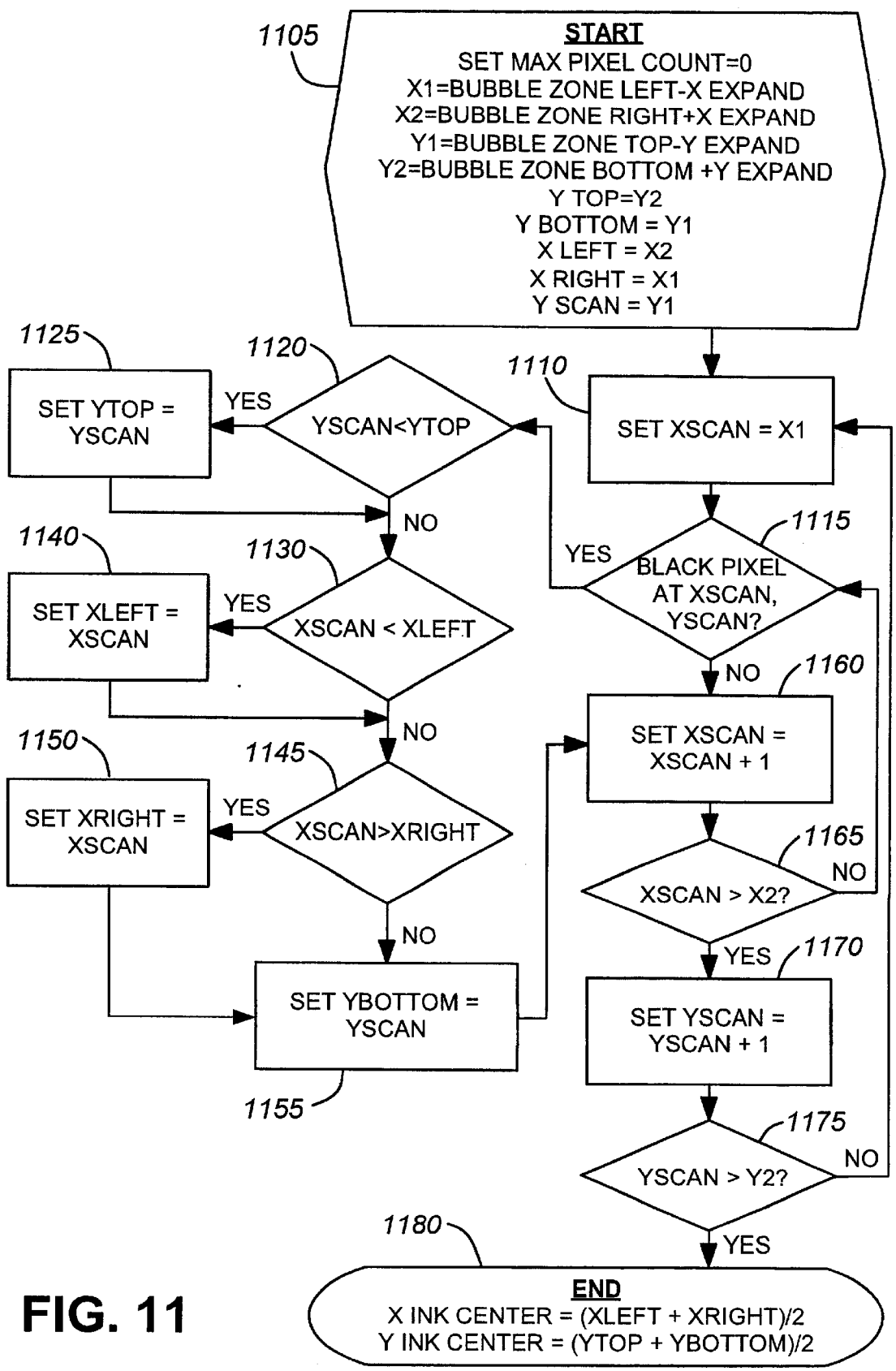
FIG. 11 depicts a locate-ink-bubble-center process of a preferred embodiment.

FIG. 10 illustrates the coordinate and zone definitions used in a preferred Locate Ink Bubble Center process, and FIG. 11 depicts the steps of that process.

Referring to FIG. 10, a coordinate system as depicted, with the y-coordinate increasing in the downward direction. A reference search zone 1020 is determined by the identified form and a Form Identification Zone Template. Because the form was identified, a bubble ink circle 1030, with center at (XInk,YInk), was been found within a particular reference bubble zone 1010. Reference bubble zone 1010 is such that a reference bubble has center (X0, Y0), which is also the center of reference bubble ink zone 1010. Reference search zone 1020 is defined by extending bubble ink zone 1010 a distance Xexpand horizontally in each direction (left and right) and a distance Yexpand vertically in each direction (up and down).

Thus, reference search zone 1020 is a rectangle whose corners have coordinates (X1, Y1) (upper left corner), (X2, Y1) (upper right corner), (X2, Y2) (lower right corner), and (XI, Y2) (lower left corner).

A Locate Ink Bubble Center process is depicted in FIG. 11. At step 1105, variables are initialized. BubbleZoneLeft is the x-coordinate of the left side of bubble zone 1010. BubbleZoneRight is the x-coordinate of the right side of bubble zone 1010. BubbleZoneTop is the y-coordinate of the top side of bubble zone 1010. BubbleZoneBottom is the y-coordinate of the bottom side of bubble zone 1010. A variable YScan is set to Y1.

The variables YTop, YBottom, XLeft, and XRight are initially set to Y2, Y1, X2, and X1, respectively. At the end of the Locate Ink Bubble Center process, the variable YTop will contain the value of the y-coordinate of the top of bubble ink 1030, YBottom will contain the value of the y-coordinate of the bottom of bubble ink 1030, XLeft will contain the value of the x-coordinate of the left side of bubble ink 1030, and XRight will contain the value of the x-coordinate of the right side of bubble ink 1030. Note that the process is robust, in that even if bubble ink 1030 is not a perfect disk, the process will determine a "center" for bubble ink 1030.

At step 1110, a variable XScan is set to X. At step 1115, a check is made whether a black pixel is located at (XScan, YScan) (which initially is at (X1, Y1), the upper-left corner of reference search zone 1020. If the answer is no, then at step 1160 the variable XScan is incremented. If when the value is checked at step 1165 the incrementation does not result in a value greater than X2 (i.e., if the scan has not reached the right side of reference search zone 1020), step 1115 is repeated. If at step 1165 the incrementation at step 1160 of the variable XScan does result in XScan having a value greater than X2, then at step 1170 the variable YScan is incremented. If when the value of YScan is checked at step 1175 the value of YScan is greater than Y2, then at step 1180 XInkCenter and YlnKCenter are calculated. If at step 1175 the value of YScan is not greater than Y2, then step 1110 is repeated. The software scans from left to right, top to bottom over reference search zone 1020.

If the answer at step 1115 is yes, then at step 1120 a check is made as to whether the current value of the variable YScan is less than the current value of YTop. If yes, then at step 1125 YTop is set equal to YScan. Thus, the top of bubble ink 1030 has been found, and its y-coordinate has been determined to be the current value of YScan. Step 1130 follows step 1120 if the answer at step 1120 is no, and follows step 1125 if the answer at step 1120 is yes.

At step 1130, a check is made as to whether the current value of XScan is less than the current value of XLeft. If the answer is yes, then at step 1140 XLeft is set equal to XScan. Step 1145 follows step 1140 if the answer at step 1130 is yes, and follows step 1130 if the answer at step 1130 is no.

At step 1145, a check is made as to whether XScan is greater than XRight. If the answer is yes, then at step 1150 XRight is set equal to XScan. Step 1155 follows step 1145 if the answer at step 1145 is no, and follows step 1150 if the answer at step 1145 is yes. At step 1155, YBottom is set equal to YScan. Step 1160, discussed above, follows step 1155. As the process continues, the value of YTop decreases until it reflects the value of the y-coordinate of the uppermost pixel in bubble ink 1030; the value of YBottom increases until it reflects the value of the y-coordinate of the lowermost pixel in bubble ink 1030; the value of XLeft decreases until it reflects the value of the x-coordinate of the leftmost pixel in bubble ink 1030; and the value of XRight increases until it reflects the value of the x-coordinate of the rightmost pixel in bubble ink 1030. Thus, when step 1180 is finally reached, the calculation of XInkCenter (=(XLeft+XRight)/2) and YInkCenter (=(YTop+YBottom)/2) will precisely determine the location of the center of bubble ink 1030 if bubble ink 1030 forms a perfect disk, and will reasonable approximate the center of bubble ink 1030 in any case. This method of determining the center of bubble ink 1030 is a preferred embodiment only, and is not intended to limit the scope of the invention as described by the appended claims. Those skilled in the art will recognize that there are a variety of known methods of determining the center of an irregularly shaped two-dimensional object that could be substituted for the above method without departing from the scope of the disclosed invention.

Returning to FIG. 9, at step 930 an offset between ink bubble 1030 and a reference bubble (with center (XMast, YMast) is calculated using the formulas XOffset= XInkCenter−XMast and YOffset=YInkCenter−YMast. The values XOffset and YOffset are then applied to shift the ink image. For example, if XOffset is positive and YOffset is negative, the ink image is shifted to the left by a distance |XOffset|, and downward by a distance |YOffset|.

Preferably, distance is measured in number of pixels. Thus, in a preferred embodiment, the ink image pixels are moved horizontally by |XOffset| pixels, and vertically by |YOffset| pixels. The following C++code illustrates a preferred method for performing the ink image shift:

```
//////////////////////////////////////////////////////
/
// Function: CalculateBubbleOffset
//
// algorithm for calculating auto-alignment offsets
// Parameters:
//        in
//              hIImg          BITMAPHANDLE * with ink pixels containing bubble
//              iBubbleTop     Y coordinate of top of bubble reference zone
//              iBubbleLeft    X coordinate of left of bubble reference zone
//              iBubbleBottom  Y coordinate of bottom of bubble reference zone
//              iBubbleRight   X coordinate of right of bubble reference zone
//
//        out
//              *piOffsetX set to calculated XOffset or 0 as default
//              *piOffsetY set to calculated YOffset or 0 as default
// returns: 0 if no bubble found
//          1 if bubble found
//
```

```
int CalculateBubbleOffset(  BITMAPHANDLE *hIlmg,
                            int iBubbleTop,
                            int iBubbleLeft,
                            int iBubbleBottom,
                            int iBubbleRight,
                            int *piOffsetX,
                            int *piOffsetY)
{
    #define EXPAND_Y    50 // reference search zone offset in Y direction
    #define EXPAND_X    40 // reference search zone offset in X direction
    #define ALIGN_THRESHOLD 50 // maximum allowed auto-align in pixels
    int iReturn = 0;
    // initially no offset
    *piOffsetX = *piOffsetY = 0;
    COLORREF cr;
    int x,y;
    int iMinY = -1;
    int iMinX = -1;
    int iMaxY = -1;
    int iMaxX = -1;
    int iStartY = __max(iBubbleTop - EXPAND_Y, 0);
    int iStartX = __max(iBubbleLeft - EXPAND_X, 0);
    int iEndY = iBubbleBottom + EXPAND_Y;
    int iEndX = iBubbleRight + EXPAND_X;
    bool bFound = false;
    for (y = iStartY; y <= iEndY; y++)
    {
      h=0;
      for (x = iStartX; x <= iEndX; x++)
      {
        // check for black pixel
        cr = GetPixelColor(hLlmg, y, x);
        if (cr == RGB(0,0,0))
        {
          if (!bFound)
            bFound = true;
          // initialize all coords to first black pixel
          if (iMinY == -1)
          {
            iMinY = y;
          }
          if(iMaxY == -1)
          {
            iMaxY = y;
          }
          if (iMinX == -1)
          {
            iMinX = x;
          }
          if (iMaxX == -1)
          {
            iMaxX = x;
          }
          // update mins and maxes
          if (x > iMaxX)
             iMaxX = x;
          if (x > iMaxY)
             iMaxY = y;
          if (x < iMinX)
             iMinX = x;
        }
      }
    }
    if (bFound)
    {
      iReturn = 1;
      // calculate center of bubble ink (XInk, YInk)
      int iBubbleCenterX = iMinX + (iMaxX - iMinX);
      int iBubbleCenterY = iMinY + (iMaxY - iMinY);
      // calculate center of reference bubble (X0, Y0)
      int iReferenceCenterX = iBubbleLeft + (iBubbleRight - iBubbleLeft);
      int iReferenceCenterY = iBubbleTop + (iBubbleBottom - iBubbleTop);
      // calculate automatic form alignment offsets (XOffset, YOffset)
      *piOffsetX = iBubbleCenterX - iReferenceCenterX;
      *piOffsetY = iBubbleCenterY - iReferenceCenterY;
      // make sure offset is no bigger than max
```

-continued

```
    *piOffsetX = __min(*plOffsetX, ALIGN_THRESHOLD);
    *piOffsetY = __min(*plOffsetY, ALIGN_THRESHOLD);
  }
  else
  {
    TRACE0(_T("CalculateBubbleOffset no ink found in bubble zone.\n"));
  }
  return iReturn;
}
// end Function: CalculateBubbleOffset
//////////////////////////////////////////////////////////////
```

The ink pixels are offset by merging the loaded ink with a programmatically-created white page "null" image. A bitwise add algorithm that sets the pixel result to a maximum of 255 (white) is used to merge the pixels. The following code performs this operation:

| | |
|---|---|
| CombineBitmapPixels(&bmpWhitePage, | // created "white page" pixel data structure (also result destination) |
| 0, | // X origin for white page pixels |
| 0, | // Y origin for white page pixels |
| BITMAPWIDTH(&bmpWhitePage), | // total X pixels in white page |
| BITMAPHEIGHT(&bmpWhitePage), | // total Y pixels in white page |
| &bmpInk, | // loaded ink pixel data structure |
| iXOffset, | // X origin for ink pixels (XOffset) |
| iYOffset, | // Y origin for ink pixels (YOffset) |
| CB_OP_ADD); | // merge algorithm type |

Once the ink image has been shifted (aligned), OMR and OCR processing occurs—at step 950 the aligned image is recognized.

FIG. 12 depicts a preferred ink image recognition process. At step 1210 a field definition file for a form is loaded. At step 1220, an ink image is loaded into memory. At step 1230, the field definition file and the image are passed to a recognition engine for recognition, and at step 1240 the recognized results are saved to a database.

Figure 13:
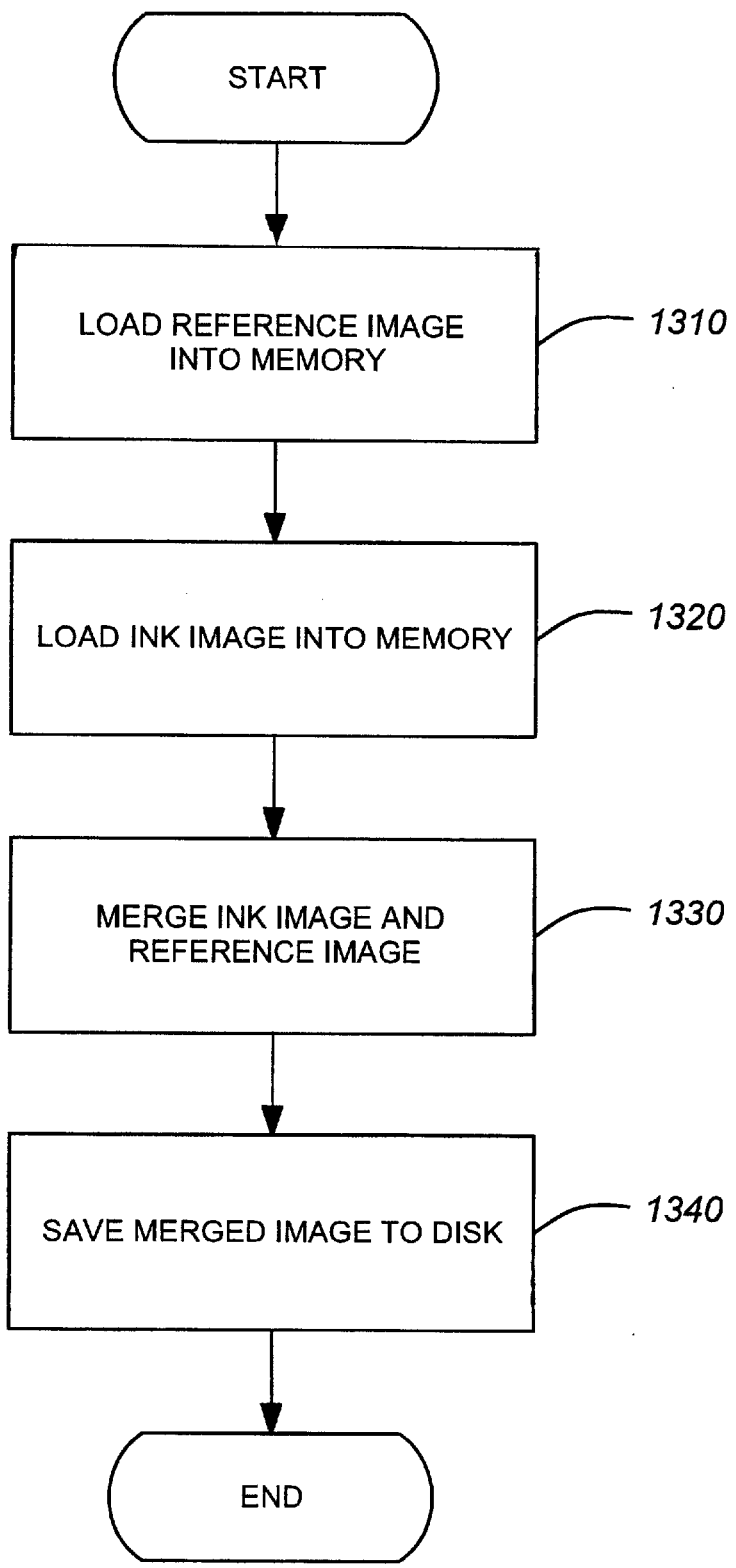
FIG. 13 depicts a merge-aligned-ink-with-reference-image process of a preferred embodiment.

Returning to FIG. 9, at step 960 the aligned, recognized ink image is aligned with a reference image of the identified (blank) form. This process is depicted in FIG. 13. At step 1310, the reference image of the form is loaded into memory. At step 1320 the ink image is loaded into memory.

At step 1330 the ink image is merged with the reference image. The ink pixels are merged with the reference image pixels programmatically using a bitwise OR algorithm to merge the pixels. The following code performs this operation:

| | |
|---|---|
| CombineBitmapPixels( &bmpInk, | // loaded ink pixel data structure (also result destination) |
| 0, | // X origin for ink pixels |
| 0, | // Y origin for ink pixels |
| BITMAPWIDTH(&bmpInk), | // total X pixels in ink |
| BITMAPHEIGHT(&bmpInk), | // total Y pixels in ink |
| &bmpReference, | // loaded reference pixel data structure |
| 0, | // X origin for reference pixels |
| 0, | // Y origin for ink pixels |
| CB_OP_OR); | // merge algorithm type |

Finally at step 1340, the merged image is saved to a disk or other storage medium.

Figure 14:
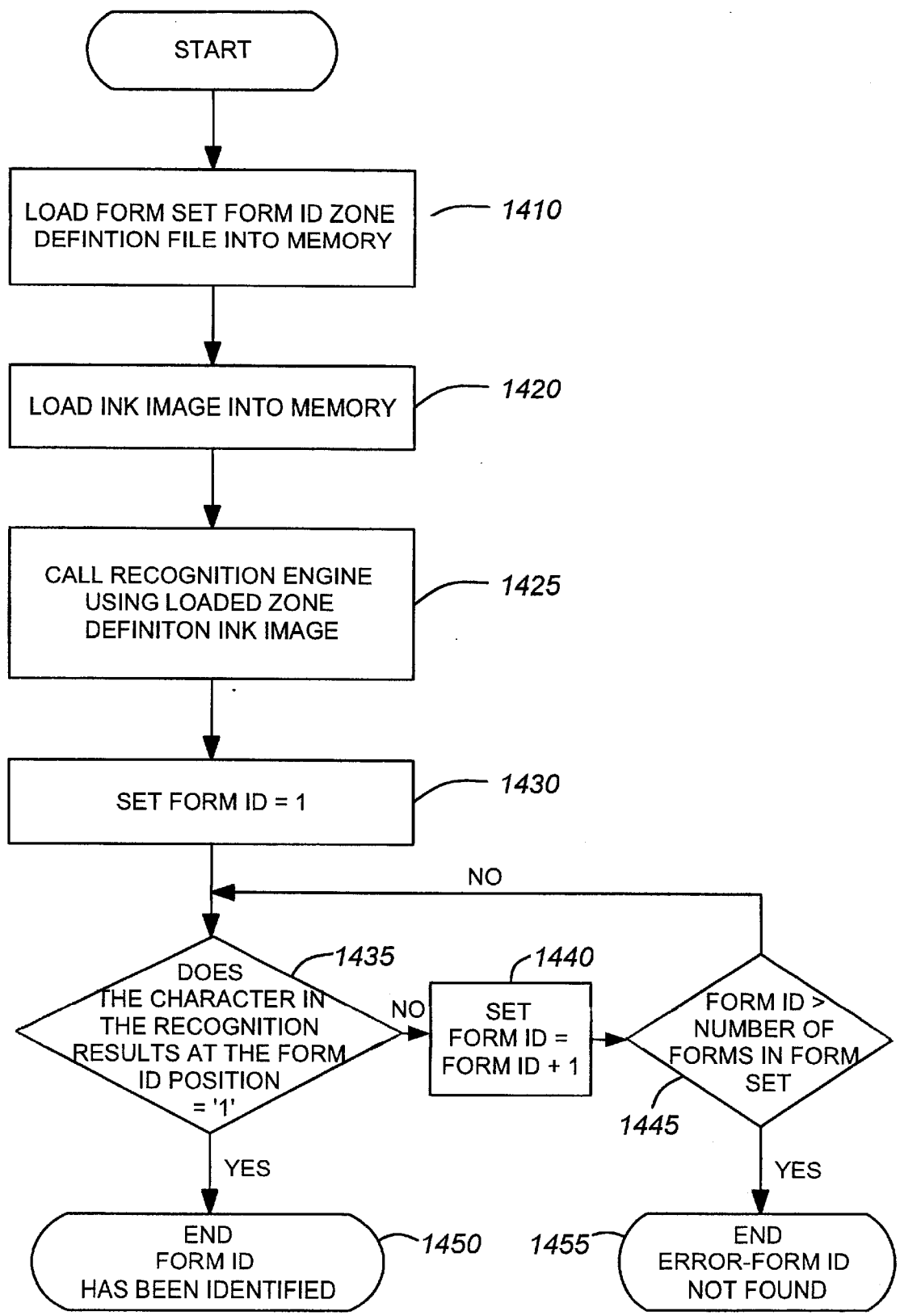
FIG. 14 depicts a form identification process of a preferred embodiment.

FIG. 14 depicts a form identification process of a preferred embodiment. Some of this process is also shown in FIG. 5. At step 1410, a form set Form ID zone definition file is loaded into memory. At step 1420 an ink image is loaded into memory. At step 1425, a recognition is called and the loaded zone definition and ink image are used. At step 1430 a variable FormID is set equal to 1. At step 1435, a check is made as to whether the character in the recognition results at the FormID is equal to 1. If so, the form has been identified, and the process ends at step 1450. If not, then step 1440, is performed, wherein FormID is incremented. At step 1445, a check is made as to whether FormID is greater that the number of forms in the form set. If so, then the process ends at step 1455 with the form not identified. If not, then the process returns to step 1435.

In a further embodiment of the subject invention, pre-printed forms that do not have a form indicator printed thereon are used. To enable the use of such forms, a template, preferably metal or plastic, is affixed to a digitizer pad. The template acts as a stencil (see FIG. 15): a user fills in holes in the guide; each hole corresponds to a different form. In this manner, the form identification process described above is applied to forms that do not have pre-printed form indicators.

Figure 15:
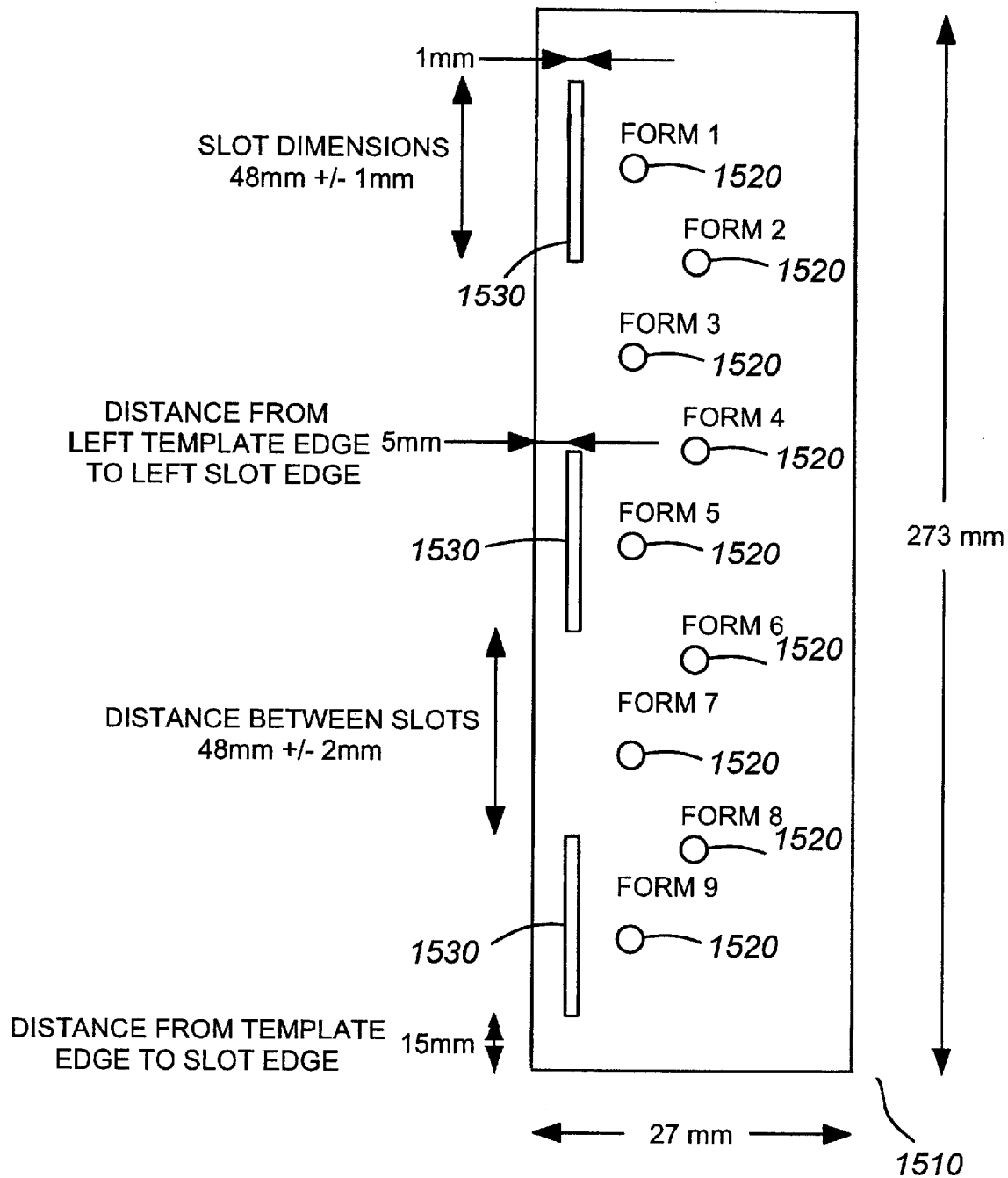
FIG. 15 depicts a form identifier template of a preferred embodiment.

In a preferred embodiment, a configuration such as that depicted in FIG. 15 is used. The template is preferably a plastic overlay 1510 that fits over side paper guides (see FIG. 16, which shows a digitizer pad with three side paper guides 1610 on the left side)) on a digitizer pad (preferably a CrossPad or derivative thereof). The template 1510 preferably has three slots 1530 that enable it to fit over three raised paper guides on the digitizer pad. Those skilled in the art will recognize that other methods of attachment would be substituted for digitizer pads of other configurations. For example, if there is only one raised paper guide on the digitizer pad, and it is on the right-hand side of the pad, template 1510 would have only one slot, along its right side.

Returning to the preferred embodiment depicted in FIG. 15, the three slots 1530 are approximately (±2 mm) 48 mm apart, 1 mm wide, 5 mm from the left-hand edge of template 1510, and approximately (±1 m) 48 mm long. The top of topmost slot 1530 is preferably 15 mm from the top edge of template 1510, and the bottom of bottom-most slot 1530 is referably 15 mm from the bottom edge of template 1510.

Template 1310 itself is approximately 2 mm thick, 273 mm long, and 27 mm wide. Each form indicator bubble 1520 is preferably 2.5 mm in diameter, and the minimum preferred distance between bubbles 1520 is 4 mm.

While the embodiments shown and described are fully capable of achieving the objects of the invention, it is to be understood that these embodiments are shown only for the purpose of illustration and not for the purpose of limitation. For example, a CrossPad could be easily be modified so that a user is able to skip from page to page (e.g., from page 14 directly to page 3) instead of having to repeatedly hit the page-up and page-down buttons.

What is claimed is:

1. A method of automated identification of pre-printed forms, comprising the following steps a, b, c,d, and e:
   (a) overlaying a pre-printed form with a marking guide template having one or more marking guide indicia;
   (b) performing one of steps b1 and b2
       (1) manually pre-applying on said pre-printed form guided by said indicia one or more notations unique to said form and subsequently manually entering on said pre-printed form guided by said notations one or more identifying marks;
       (2) manually entering on said pre-printed form guided by said indicia one or more identifying marks;
   (c) simultaneously receiving said manually entered one or more identifying marks into a digitizer;
   (d) digitizing said received one or more identifying marks to yield one or more digitized identifying marks; and
   (e) identifying said pre-printed form from said one or more digitized identifying marks.

2. A system for automated identification of pre-printed forms, comprising:
   a) a digitizer;
   b) a pre-printed form;
   c) a marking guide template for overlaying said pre-printed form, said template having one or more marking guide indicia indicating where a user is to provide one of c1 and c2:
       (1) one or more notations unique to said form manually pre-applied on said pre-printed form and one or more identifying marks subsequently entered on said form and simultaneously into said digitizer guided by said notations;
       (2) one or more identifying marks manually entered on said pre-printed form and simultaneously into said digitizer guided by said indicia; and
   d) a computer processor, coupled with a database, capable of
       i) receiving one or more digitized images of said manually entered identifying marks;
       ii) digitizing said identifying marks to yield one or more digitized identifying marks; and
       iii) identifying said form from said digitized identifying marks.

3. Computer software for automated identification of pre-printed forms, wherein a user:
   (a) overlays a pre-printed form with a marking guide template having one or more marking guide indicia; and
   (b) performs one of steps b1 and b2
       (1) manually pre-applies on said pre-printed form guided by said indicia one or more notations unique to said form and subsequently manually entering on said pre-printed form guided by said notations one or more identifying marks;
       (2) manually enters on said pre-printed form guided by said indicia one or more identifying marks; said computer software being capable of:
           (i) simultaneously receiving said manually entered one or more identifying marks into a digitizer;
           (ii) digitizing said received one or more identifying marks to yield one or more digitized identifying marks; and
           (iii) identifying said pre-printed form from said one or more digitized identifying marks.

4. The system of claim 2, wherein said template has a user surface and a digitizer surface.

5. The system of claim 4, wherein said indicia include one or more marking guide apertures formed in said template and extending from said user surface through to said digitizer surface.

6. The system of claim 4, wherein said indicia include one or more marking guide notations pre-printed on said digitizer surface and/or said user surface.

7. The system of claim 4, further including at least one positioner for positioning said template on said pre-printed form to ensure proper orientation of said indicia relative to said form.

8. The system of claim 7, wherein said template further includes at least one positioning aperture formed therein and extending from said user surface through to said digitizer surface, said positioning aperture for use in interlocking cooperation with said positioner.

9. The system of claim 8, wherein said positioner is at least one raised paper guide integrated into said digitizer.

10. The system of claim 8, wherein said positioner is at least one raised paper guide integrated into a digitizer simulator.

11. The method of claim 1, wherein step (a) includes the step of positioning said template on said pre-printed form using at least one positioner to ensure proper orientation of said indicia relative to said form.

12. The method of claim 11, wherein said positioning step is performed with the aid of at least one positioner integrated into said digitizer.

13. The method of claim 11, wherein said positioning step is performed with the aid of at least one positioner integrated into a digitizer simulator.

14. The method of claim 13, wherein said template further includes at least one positioning aperture formed therein and extending from said user surface through to said digitizer surface, said positioning aperture for use in interlocking cooperation with said positioner.

15. The method of claim 14, wherein said positioner is at least one raised paper guide integrated into said digitizer.

16. The method of claim 14, wherein said positioner is at least one raised paper guide integrated into a digitizer simulator.

* * * * *